April 23, 1957     F. FRUENGEL     2,789,382
METHOD AND SYSTEM FOR CHECKING THE POSITION OF FISHING NETS
Filed May 13, 1955
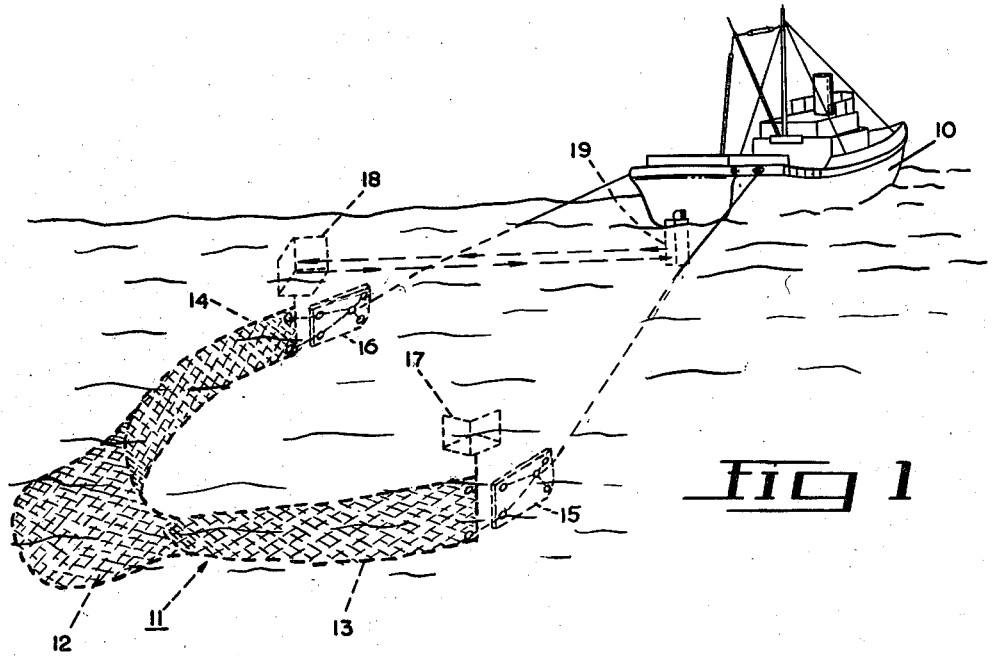
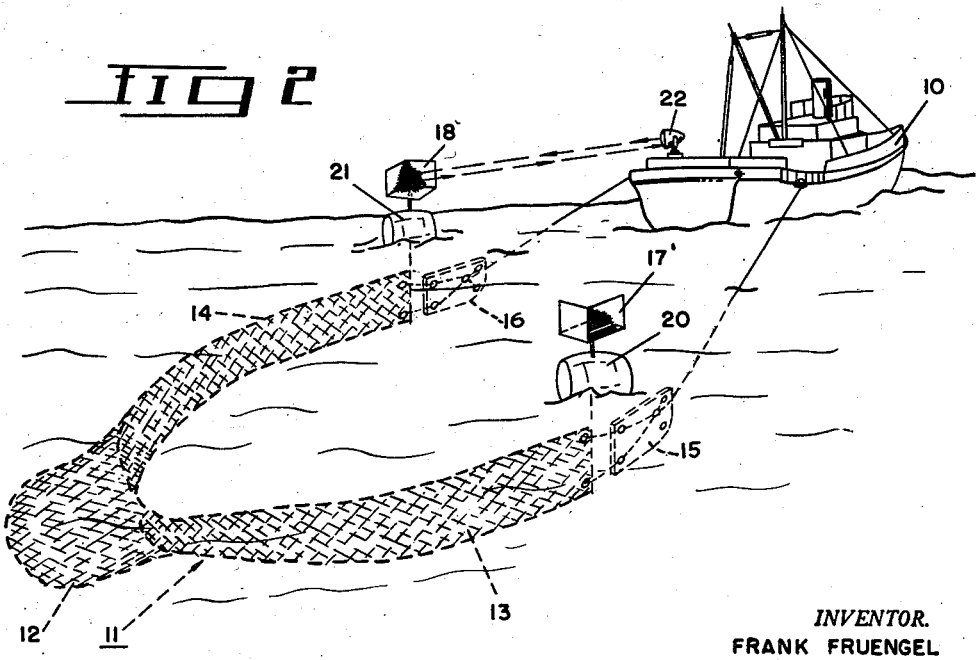
INVENTOR.
FRANK FRUENGEL
BY William H. Kuner United States Patent Office 2,789,382
Patented Apr. 23, 1957

2,789,382

METHOD AND SYSTEM FOR CHECKING THE POSITION OF FISHING NETS

Frank Fruengel, Hamburg-Rissen, Germany

Application May 13, 1955, Serial No. 508,247
In Germany June 27, 1949

Section 1, Public Law 690, August 8, 1946
Patent expires June 27, 1969

7 Claims. (Cl. 43—4.5)

The present invention relates to fishing gear and more particularly to a method and system for locating and checking the position of fishing nets by totally reflected sound having ultrasonic frequency or by totally reflected light signals.

In fishing with trawl-nets, a type of fishing gear that has gained widespread acceptance, the net, having a center portion and two net wings, is towed at slow speed and at great distance behind the fishing vessel. In most cases the net is kept open by sheer boards ("otter boards") attached to the forward end of each wing somewhat outwardly inclined to the direction of travel so that when the net is towed, the two boards sheer in opposite directions and keep the mouth of the net open. In operation, when the quantity of catch increases and the net becomes heavier, the spacing of the sheer boards decreases so that their spacing is an indication of the state of catch. Thus it is very important for the fishermen to watch closely the position of the sheer boards which themselves travel under water and are not directly visible by sight. Optical observation, for instance, by means of buoys or floats, attached to the wings of the net, is often very difficult since the distance between vessel and net is generally more than 1500 fathoms. Tracing by means of echo sounding is of interest, requires, however, powerful ultrasonic energy sources in order to assure echo signals from the sheer boards which are strong enough to be detected with certainty on board the fishing vessel.

In order to overcome difficulties as pointed out above, the present invention provides a system for the purpose set forth which requires relatively little sounding energy and gives strong echo signals.

To achieve this end, it is an object of this invention to provide the sheer boards and other strategic points of the fishing net with triple reflectors or mirrors which at any inclination with respect to the transmitter give complete reflection in the direction of incidence, also toward the transmitter.

Another object of this invention is to provide optical triple mirrors for total reflection of a beam of light for operation above the surface of the water and sound reflecting triple mirrors for underwater operation.

For a better understanding of other features of the invention, some systems will now be described in connection with the accompanying drawing in which:

Fig. 1 is a diagrammatic representation of a system for underwater echo signaling; and Fig. 2 is a similar representation of a system for light-reflection signaling.

Referring to the drawing, the fishing vessel, indicated at 10, tows a net 11 having a center bag portion 12 and two net wings 13, 14. At the forward ends of the net wings there are secured inclined sheer boards 15, 16 sheering in opposite direction and keeping the net open. Substantially vertically above the sheer boards, but still below the water surface there can be seen fastened to the net triple reflectors 17, 18 suitable for sound reflection.

Triple reflectors or mirrors, as well known in the art, have three reflecting, substantially square planes each perpendicular to the other two as the three sides adjacent to a corner of a cube. A ray of light or a beam of sound impinging upon the inner surface of one of these three planes is reflected in its direction of incidence so that one receives at the point of transmission always a total reflection from the triple mirror no matter what inclination it takes. Such total or complete reflection is very effective and relatively low transmitter energy will result in strong echo signals which surpass in intensity by far interferences introduced by the water surface and make possible clear and definite observation.

The vessel 10 carries and ultrasonic transmitter 19 which beams an ultrasonic signal toward triple reflector 17 or 18. When the ultrasonic beam strikes one of the reflectors the beam is reflected in the direction of incidence, i. e., toward the transmitter 19. Thus the location of the net, the position of the sheer boards with respect to each other and therefrom the quantity of catch can be determined.

Somewhat similar results as with sound having ultrasonic frequency under water can be obtained, when employing a light beam and optical triple mirrors, above the surface of the water as depicted in Fig. 2. Here the triple mirrors 17', 18' are secured to floats or buoys 20, 21 extending to the water surface at points of the net located above the sheer boards. A searchlight 22, mounted on deck of the fishing vessel, sends a beam of light toward the mirrors and light incident on either one of the mirrors will be reflected in the direction of incidence in the same manner as sound under water.

In triple reflectors for sound having ultrasonic frequency the three planes forming the reflector are preferably constructed to render good total reflection against water. Such construction consists, for instance, of air-filled, thin-walled sheets of metal or a material having a considerably different wave resistance than water, for example, brass or steel.

While the systems illustrated and described are provided each with two triple reflectors, it will be understood that also one and more than two such reflectors can be employed in one system and that also fishing gear comprising other types of netting can utilize the system as provided by this invention.

It will be further understood that systems comprising other arrangements and construction of parts can be devised by those skilled in the art without departing from the spirit and scope of this invention as claimed in the appended claims which it is desired to construe as broadly as possible in view of the prior art.

What is claimed is:

1. In a fishing arrangement including a fishing vessel and a fishing gear consisting of a net towed by said vessel; the system comprising an ultrasonic transmitter mounted on board said vessel and being operative in transmitting ultrasonic underwater signals in a direction toward said net, at least one triple reflector suitable for complete underwater reflection of a beam of sound having ultrasonic frequency secured to a strategic point of said net, whereby the position of such strategic point can be determined by intensity and direction of the echo sound.

2. In an arrangement for fishery including a fishing vessel and a fishing gear consisting of a net having a center bag and two net wings and sheer boards attached to the forward end of each wing; a system comprising an ultrasonic underwater transmitter on board the fishing vessel being operative in transmitting ultrasonic underwater signals in a direction toward said net, a triple reflector for ultrasound secured to each forward end of each net wing above each sheer board, each triple reflector being operative in completely reflecting a beam of sound having ultrasonic frequency in the direction of incidence, whereby the position of the sheer boards and thus the quantity of catch can be determined by intensity and direction of the echo sound.

3. In an arrangement for fishery including a fishing vessel and a fishing gear towed by the vessel and consisting of a net having a center bag and two net wings and sheer boards attached to the forward end of each wing; a system comprising a searchlight on board the fishing vessel being operative in projecting a beam of light in the direction toward the net, a buoy fastened to each net wing above each sheer board and floating on the water surface, a triple mirror secured to each buoy being operative in completely reflecting a beam of light in the direction of incidence, whereby the position of the sheer boards and thus the quantity of catch can be determined by intensity and direction of the reflected light.

4. In a fishing arrangement including a fishing vessel and a fishing gear consisting of a net towed by said vessel and having a center bag portion and two wing portions being kept open by otter boards attached to the lower part of said wing portions; the system which comprises an ultrasonic underwater transmitter mounted on board said vessel and being operative in transmitting ultrasonic underwater signals toward the outer extremities of said wing portions, a triple reflector for sound having ultrasonic frequency secured to each of said extremities substantially above said otter boards and being operative in completely reflecting ultrasonic underwater signals toward their point of origin, whereby to ascertain by received echo signals the spacing of said otter boards and thus the quantity of catch.

5. The method of checking the position of fishing nets which comprises securing at strategic points of a fishing net triple reflectors suitable for complete underwater reflection of a beam of sound having ultrasonic frequency in the direction of incidence and transmitting from a fishing vessel ultrasonic underwater signals toward said triple reflectors to determine by intensity and direction of the echo sound the position of such strategic points of the net.

6. The method of checking the position of fishing nets which comprises securing to buoys floating on the water surface above strategic points of a fishing net triple mirrors suitable for complete reflection of a beam of light in the direction of incidence and flashing from a fishing vessel light signals toward said triple mirrors to determine by intensity and direction of reflected light the position of such strategic points of the net.

7. The method of determining the quantity of catch in a fishery trawl-net by checking the spacing between the otter boards attached one to each extremity of the net wings, which comprises securing to each net extremity above the otter board a triple reflector suitable for complete underwater reflection of a beam of sound having ultrasonic frequency in the direction of incidence, transmitting from a fishing vessel ultrasonic underwater signals toward each of said triple reflectors, and computing from echo soundings reflected from each triple reflector the spacing of the net wings and thereby the quantity of catch.

References Cited in the file of this patent

UNITED STATES PATENTS

| 1,384,014 | Fessenden | July 5, 1921 |

FOREIGN PATENTS

| 793 | Great Britain | 1905 |
| 816,324 | Germany | Oct. 8, 1951 |
| 816,620 | Germany | Oct. 11, 1951 |